3,218,296
INITIATORS FOR THE POLYMERIZATION
OF FORMALDEHYDE
Henri Sidi, Paramus, N.J., assignor, by mesne assignments, to Tenneco Chemicals, Inc., a corporation of Delaware
No Drawing. Filed July 30, 1962, Ser. No. 213,169
12 Claims. (Cl. 260—67)

This invention relates to a process for the production of tough, high molecular weight polymers of formaldehyde. More particularly it relates to the use of epoxy esters as polymerization initiators in the preparation of these polymers of formaldehyde.

The polymerization of monomeric formaldehyde to solid polymers is known in the art, and several processes have been developed using various initiators. This invention provides a process using a new and different class of polymerization initiators.

It is an object of this invention to provide a new and useful process for the polymerization of monomeric formaldehyde to high molecular weight, normally solid polyoxymethylene. A further object of this invention is to provide a new class of initiators for the polymerization of formaldehyde to high molecular weight polyoxymethylene. Other objects will appear hereinafter.

The objects of this invention may be accomplished by contacting substantially anhydrous monomeric formaldehyde with an epoxy ester and recovering the high molecular weight polyoxymethylene formed thereby.

The epoxy esters that are employed in this process to initiate the polymerization of formaldehyde are esters of monohydric or polyhydric aliphatic alcohols and epoxidized fatty acids. The epoxidized fatty acids are water-insoluble aliphatic acids that result from the conversion to an epoxy (oxirane)

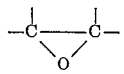

group of at least one ethylenic linkage of an ethylenically unsaturated fatty acid containing from 10 to 22 carbon atoms. Examples of suitable epoxy esters include the esters of such alcohols as methanol, ethanol, isopropanol, hexanol, 2-ethylhexanol, dodecanol, octadecanol, ethylene glycol, propylene glycol, butylene glycol, hexamethylene glycol, glycerol, trimethylolethane, trimethylolpropane, pentaerythritol, dipentaerythritol, sorbitol, mannitol, and sucrose with epoxidized oleic, linoleic, linoelenic, undecylenic, myristolenic palmitolenic, petroselic, and erucic acids. Also useful are esters of epoxidized drying oil fatty acids and epoxidized semi-drying oil fatty acids, which are mixtures of fatty acids including substantial amounts of epoxidized fatty acids. These include, for example, epoxidized soybean oil fatty acids, epoxidized linseed oil fatty acids, epoxidized tall oil fatty acids, epoxidized corn oil fatty acids, epoxidized cottonseed oil fatty acids, epoxidized safflower oil fatty acids, epoxidized menhaden oil fatty acids, and epoxidized perilla oil fatty acids. The preferred epoxy esters are the polyhydric alcohol esters of epoxidized fatty acids containing from 10 to 22 carbon atoms. Particularly preferred as polymerization initiators are pentaerythritol and glycerol esters of epoxidized drying and semi-drying oil fatty acids, such as pentaerythritol tetraester of epoxidized tall oil fatty acids, pentaerythritol tetraester of epoxidized soybean oil fatty acids, pentaerythritol tetraester of epoxidized linseed oil fatty acids, epoxidized soybean oil, epoxidized corn oil, epoxidized linseed oil, epoxidized perilla oil, epoxidized menhaden oil, and glycerol triester of epoxidized tall oil fatty acids.

The epoxy esters may be prepared by any convenient procedure. For example, they may be prepared by reacting an epoxidized fatty acid with the appropriate alcohol. Alternatively, an ester of unsaturated fatty acids may be reacted with an epoxidizing agent, such as hydrogen peroxide, performic acid, peracetic acid, perbenzoic acid, or perphthalic acid, at a temperature betwen approximately 10° C. and 80° C. until at least one of the ethylenic linkages of the fatty acid has been converted to an epoxy group. A process for the epoxidation of esters of unsaturated fatty acids is described in Swern and Findley Patent U.S. 2,569,502.

The epoxy esters that are used in the practice of the present invention contain from approximately 3.0% to 8.0% and preferably 4.5% to 7.5% of oxirane oxygen. In each case the oxirane oxygen content is largely dependent upon the molecular weight of the ester and the degree of unsaturation of the acids used in its preparation.

The amount of initiator that is used in the polymerization of formaldehyde is not critical. Generally between about 0.0001 part and 0.5 part and preferably between about 0.001 part and 0.05 part by weight of the initiator is used per part by weight of formaldehyde.

The polymerization reaction may be carried out in the presence of liquid reaction medium or as a vapor phase reaction. It is preferably carried out in a substantially anhydrous organic medium which remains liquid under the conditions chosen for the reaction, which is inert to formaldehyde and to the polymerization initiator, and which is a non-solvent for polyoxymethylene. Suitable reaction media include hydrocarbons, hydrocarbon halides, ethers, and esters. The preferred media are hydrocarbons that contain from 3 to 10 carbon atoms, such as propane, butane, hexane, octane, decane, cyclohexane, benzene, toluene, xylene, and decahydronaphthalene. The amount of the reaction medium used is generally within the range of approximately 1 to 1000 parts by weight and preferably 1 to 100 parts by weight per part by weight of formaldehyde.

The polymerization may be carried out by introducing anhydrous monomeric formaldehyde into a reactor containing the reaction medium and the polymerization initiator. Alternatively, formaldehyde may be introduced continuously into a reactor containing the reaction medium while at the same time the polymerization initiator is being added at such a rate that the temperature is maintained within the range chosen for the reaction. When the polymerization is complete, the product is recovered and dried.

The formaldehyde monomer that is used as the starting material in the process of this invention may be derived from any convenient source. It may be obtained, for example, by the pyrolysis of paraformaldehyde, trioxane, α-polyoxymethylene, or a hemiformal, such as cyclohexanol. In order that the desired tough, high molecular weight product be obtained, it is necessary that the monomeric formaldehyde used in the process of the present invention be substantially anhydrous, that is, that it contain less than 0.5% and preferably less than 0.1% by weight of water.

The conditions under which the formaldehyde is polymerized are not critical. The polymerization is generally effected at a temperature between approximately —100° C. and 80° C. and preferably between 0° C. and 40° C. While subatmospheric and superatmospheric pressures may be employed, the polymerization reaction in most cases takes place under atmospheric pressure.

The formation of tough, high molecular weight polyoxymethylene is best accomplished under non-oxidizing conditions. One way of obtaining such conditions involves sweeping the reactor with a dry inert gas, such as nitrogen, and then carrying out the polymerization under a blanket of the inert gas. In addition an antioxidant may be present in the reaction medium and/or may be added to the product to reduce oxidative effects. Among the antioxidants that may be used for this purpose are phenothiazine, 2-mercaptobenzimidazole, diphenylamine, phenyl-α-naphthylamine, bis (β-naphthylamine)-p-phenylene diamine, 4,4'-butylidene bis (3-methyl-6-tert. butylphenol), and 5-ethyl-10,10-diphenylphenazasiline. The amount of antioxidant used may be between approximately 0.01 part and 1 part by weight per 100 parts by weight of formaldehyde.

The inherent viscosities of the formaldehyde polymers have been measured at 150° C. on solutions containing 0.5 part of polymer and 1 part of diphenylamine in 100 parts of dimethylformamide. The term "high molecular weight polyoxymethylene" as used herein refers to polyoxymethylene having an inherent viscosity at 150° C. of at least 0.1 and preferably at least 0.5 in dimethylformamide containing 1% of diphenylamine.

The following examples will illustrate the manner in which the present invention may be practiced. It is to be understood, however, that these examples are not to be construed as being limitative, but are furnished merely for the purpose of illustration. Unless otherwise noted, all parts and percentages used herein refer to parts and percentages by weight.

*Example 1*

One hundred parts of α-polyoxymethylene was pyrolyzed, and the monomeric formaldehyde which was generated was continuously swept at atmospheric pressure with a slow stream of nitrogen through a series of traps, the first of which was maintained at room temperature, the second at 0° C., and the third and fourth at —15° to —25° C. and into a reaction vessel which contained 1500 parts of cyclohexane, 0.1 part of phenothiazine, and 5 parts of pentaerythritol tetraester of epoxidized tall oil fatty acids (oxirane oxygen content, 5.56%). The reaction mixture was stirred vigorously during the addition of the formaldehyde. The polymerization was carried out at 25°–30° C. When the polymerization had been completed, the reaction mixture was filtered. The solid product was washed with 300 parts of cyclohexane and dried at 65° C. to constant weight. There was obtained 56.7 parts of polyoxymethylene which had an inherent viscosity of 2.06 at 150° C. at 0.5% concentration in dimethylformamide containing 1% of diphenylamine.

*Example 2*

One hundred grams of α-polyoxymethylene was pyrolyzed, and the monomeric formaldehyde which as generated was continuously swept at atmospheric pressure with a slow stream of nitrogen through a series of traps, the first of which was maintained at room temperature, the second at 0° C., and the third and fourth at —15° to —25° C., and into a reaction vessel which contained 1500 parts of cyclohexane, 0.1 part of phenothiazine, and 5 parts of epoxidized soybean oil (oxirane oxygen content, 7.0%). The addition of formaldehyde took place over a period of one hour during which time the reaction mixture was stirred vigorously. The polymerization was carried out at 25°–30° C. When the polymerization had been completed, the reaction mixture was filtered. The solid product was washed with 300 parts of cyclohexane and dried at 65° C. to constant weight. There was obtained 35.7 parts of polyoxymethylene which had an inherent viscosity of 1.12 at 150° C. at 0.5% concentration in dimethylformamide containing 1% of diphenylamine.

Each of the other epoxy esters that have been disclosed herein may be employed in a similar manner to initiate the polymerization of formaldehyde to form tough, high molecular weight polyoxymethylene.

Formaldehyde polymers prepared in accordance with this invention may be converted by melt extrusion, injection molding, compression molding, and other fabrication methods to shaped articles, such as fibers, films, rods, molded objects, and other articles having a high degree of toughness and other desirable and useful properties.

I claim:

1. The process for the production of high molecular weight polyoxymethylene which consists essentially of contacting substantially anhydrous monomeric formaldehyde at a temperature in the range of approximately —100° C. to 80° C. with from approximately 0.0001 part to 0.5 part by weight, based on the weight of the monomeric formaldehyde, of an ester of an oxirane-substituted carboxylic acid containing from 10 to 22 carbon atoms, thereby polymerizing the monomeric formaldehyde to a high molecular weight polyoxymethylene.

2. The process of claim 1 wherein the polymerization initiator is a pentaerythritol tetraester of epoxidized acids selected from the group consisting of epoxidized drying oil fatty acids and epoxidized semi-drying oil fatty acids.

3. The process of claim 1 wherein the polymerization initiator is a glycerol triester of epoxidized acids selected from the group consisting of epoxidized drying oil fatty acids and epoxidized semi-drying oil fatty acids.

4. The process of claim 1 wherein the polymerization initiator is the pentaerythritol tetraester of epoxidized tall oil fatty acids.

5. The process of claim 1 wherein the polymerization initiator is epoxidized soybean oil.

6. The process for the production of high molecular weight polyoxymethylene which consists essentially of introducing substantially anhydrous monomeric formaldehyde into a reaction medium consisting essentially of (a) a liquid hydrocarbon containing 3 to 10 carbon atoms, and (b) from approximately 0.001 part to 0.05 part by weight, based on the weight of the monomeric formaldehyde, of an oxirane-substituted carboxylic acid containing from 10 to 22 carbon atoms, while maintaining the reaction medium at a temperature in the range from —100° C. to 80° C., thereby polymerizing the monomeric formaldehyde to a high molecular weight polyoxymethylene.

7. The process for the production of high molecular weight polyoxymethylene which consists essentially of introducing substantially anhydrous monomeric formaldehyde into a reaction medium consisting essentially of (a) a liquid hydrocarbon containing 3 to 10 carbon atoms, (b) from approximately 0.0001 part to 0.5 part by weight, based on the weight of the monomeric formaldehyde, of an ester of an oxirane-substituted carboxylic acid containing from 10 to 22 carbon atoms, and (c) an antioxidant, while maintaining the reaction medium at a temperature in the range from —100° C. to 80° C., thereby polymerizing the monomeric formaldehyde to a high molecular weight polyoxymethylene.

8. The process of claim 7 wherein the polymerization initiator is a pentaerythritol tetraester of epoxidized acids selected from the group consisting of epoxidized drying oil fatty acids and epoxidized semi-drying oil fatty acids.

9. The process of claim 7 wherein the polymerization initiator is a glycerol triester of epoxidized acids selected from the group consisting of epoxidized drying oil fatty acids and epoxidized semi-drying oil fatty acids.

10. The process of claim 7 wherein the polymerization initiator is the pentaerythritol tetraester of epoxidized tall oil fatty acids.

11. The process of claim 7 wherein the polymerization initiator is epoxidized soybean oil.

12. The process of claim 7 wherein the reaction medium is present in the amount of 1 to 100 parts by weight per part by weight of formaldehyde and the polymerization initiator is present in the amount of approximately 0.001 part to 0.05 part by weight per part by weight of said formaldehyde.

References Cited by the Examiner

UNITED STATES PATENTS

| | | | |
|---|---|---|---|
| 2,485,160 | 10/1949 | Niederhauser et al. | 260—348 |
| 2,567,930 | 9/1951 | Findley et al. | 260—348.5 |
| 2,569,502 | 10/1951 | Swern et al. | 260—348 |
| 2,768,994 | 10/1956 | MacDonald | 260—67 |

WILLIAM H. SHORT *Primary Examiner.*